United States Patent
Bischoff et al.

(10) Patent No.: US 7,167,563 B2
(45) Date of Patent: Jan. 23, 2007

(54) DECODING DEVICE, DECODING METHOD AND CHIP-CARD

(75) Inventors: Jean-Claude Bischoff, Montagny-les-Monts (CH); Rudolph Ritter, Zollikofen (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 10/214,307

(22) Filed: Aug. 8, 2002

(65) Prior Publication Data

US 2002/0186847 A1    Dec. 12, 2002

Related U.S. Application Data

(63) Continuation of application No. PCT/CH00/00075, filed on Feb. 9, 2000.

(51) Int. Cl.
    *H04L 9/00*    (2006.01)
(52) U.S. Cl. .................. 380/277; 713/171; 725/98
(58) Field of Classification Search ............... 380/277, 380/20, 23, 28, 37, 270; 713/191, 194, 160, 713/171, 181; 382/233; 235/492; 725/50, 725/54, 98, 106
    See application file for complete search history.

(56) References Cited

U.S. PATENT DOCUMENTS

| 4,418,425 | A | * | 11/1983 | Fennel et al. .................. 380/33 |
| 5,134,656 | A |   | 7/1992  | Kudelski |
| 5,144,663 | A |   | 9/1992  | Kudelski et al. |
| 5,243,652 | A |   | 9/1993  | Teare et al. |
| 5,432,850 | A |   | 7/1995  | Rothenberg |
| 5,539,827 | A | * | 7/1996  | Liu .............................. 380/37 |
| 5,790,666 | A | * | 8/1998  | Ooi ............................ 380/239 |
| 6,215,745 | B1 | * | 4/2001 | Sako et al. .............. 369/47.12 |
| 6,215,875 | B1 |   | 4/2001 | Nohda |
| 6,351,814 | B1 | * | 2/2002 | Batinic et al. .............. 713/194 |
| 6,377,706 | B1 | * | 4/2002 | de Queiroz ................. 382/233 |
| 6,460,433 | B1 |   | 10/2002 | Ackeret et al. |
| 6,478,230 | B1 | * | 11/2002 | Deutschmann .............. 235/492 |
| 6,654,889 | B1 | * | 11/2003 | Trimberger ................. 713/191 |
| 2003/0163922 | A1 | | 9/2003 | Ackeret et al. |

FOREIGN PATENT DOCUMENTS

| EP | 723 373 A2 | 7/1996 |
| EP | 723 373 A3 | 4/1997 |
| EP | 626 793 B1 | 11/2001 |
| JP | 08-195735  | 7/1996 |
| JP | 10-207362  | 8/1998 |
| WO | WO 90/10354 | 9/1990 |
| WO | WO 94/08408 | 4/1994 |
| WO | WO 99/20438 | 10/1998 |
| WO | WO 02/04178 | 1/2002 |

* cited by examiner

*Primary Examiner*—Kim Vu
*Assistant Examiner*—T. B. Truong
(74) *Attorney, Agent, or Firm*—Blank Rome LLP

(57) ABSTRACT

Decoding device with a decoding module (4) that decodes digital digitally encoded image data. The decoding of said image data is dependent on the programming of an FPGA circuit. In a first embodiment, the key generator for the decoding module is provided with an FPGA circuit. In a second embodiment, the decoding module is provided with an FPGA circuit. The FPGA circuit and/or the FPGA memory can be located in a removable chip-card. The content of the FPGA memory can be updated by the sender over different possible transmission channels.

33 Claims, 4 Drawing Sheets

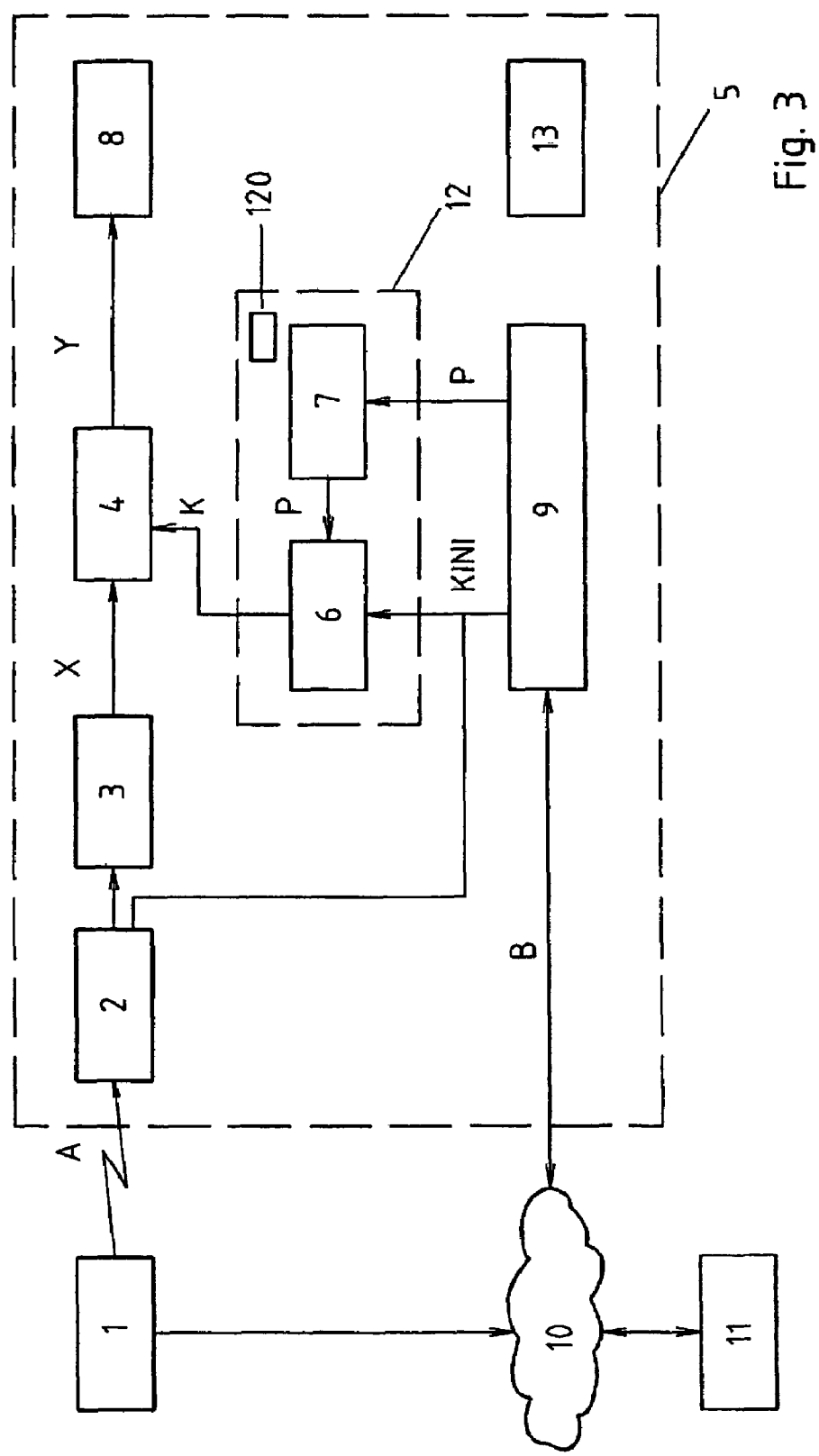

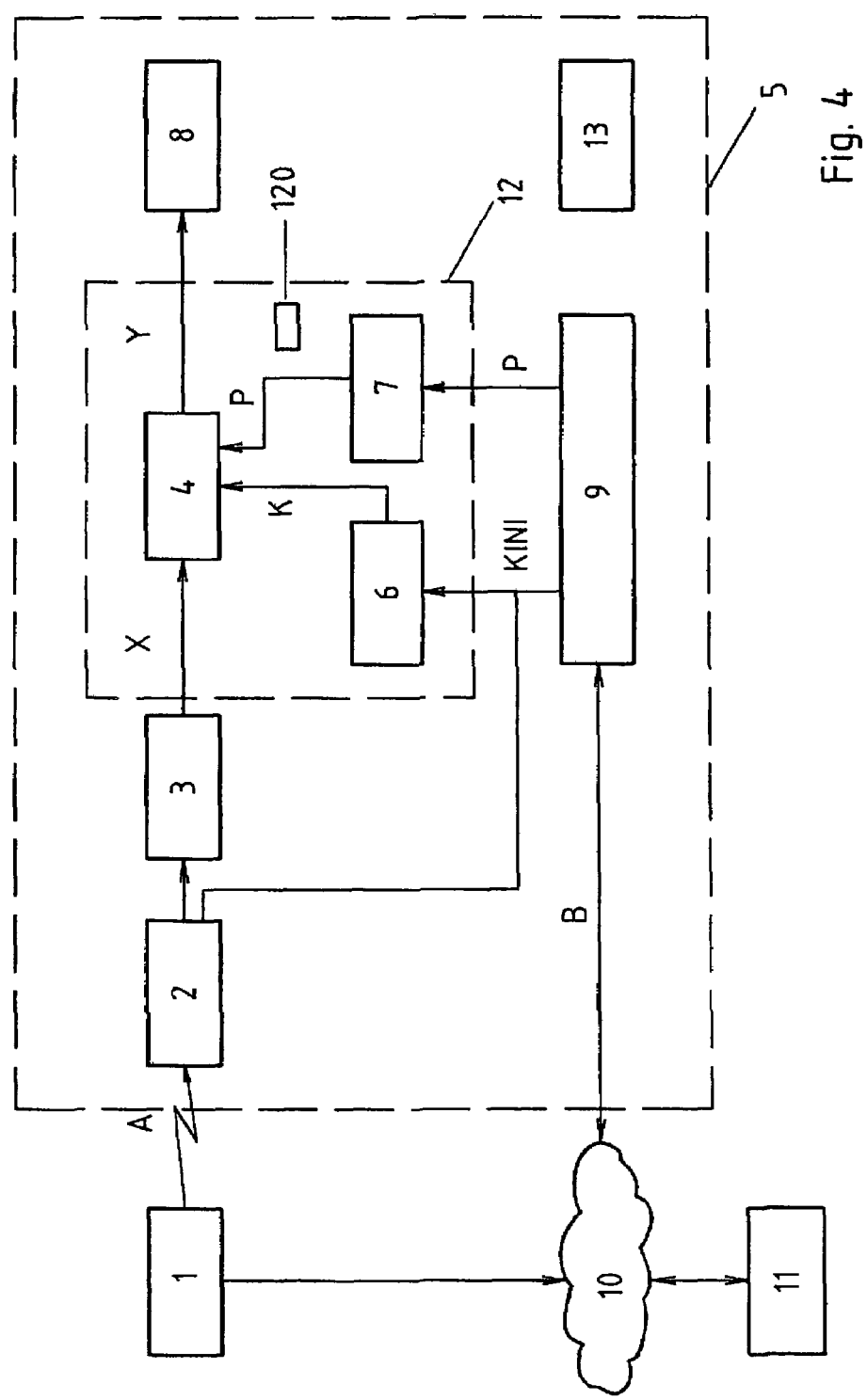

DECODING DEVICE, DECODING METHOD AND CHIP-CARD

This application is a continuation of PCT application NO. PCT/CH00/00075 filed Feb. 9, 2000, which is incorporated herein by reference.

FIELD OF THE INVENTION

The present invention concerns a decoding device, for example a decoding device that decodes encoded digital data, as well as a decoding method and a corresponding chip card.

RELATED ART

In a pay-TV system, the viewer selects the programs or the data he wishes to receive and pays for the decoding of these data that are sent encrypted. Among others, systems are known in which the viewer can subscribe with the television broadcaster for an unlimited use of the data and systems in which the users must pay only for the data that is indeed decoded, for example by means of a chip card inserted in the decoding device (pay-per-view).

In order to decode data, the viewer usually needs a decoding device with which the data sent by the sender can be decoded and that is also used for determining the duration and if necessary the billing of the chip card with the amount to be billed. Only the user who has the appropriate decoding device and the appropriate decoding key can decode the data sent in broadcast mode and reproduce them in an understandable form.

Decoding devices are also used in other systems in which the data sent, among others data sent in broadcast mode, are to be reproduced only by authorized viewers, for example in connection with the internet or with mobile radio systems.

With a Digital Audio Broadcasting (DAB) or Digital Video Broadcasting (DVB) system, it is possible so send additionally to the program also program accompanying and not program accompanying data in broadcast mode. It is often wished to address these data so that they can be decoded only by the authorized viewers with an appropriate decoding device and decoding key.

FIG. 1 shows diagrammatically a known decoding system with a sender 1 that sends data, for example image data, to a plurality of decoding devices 5, for example television receivers. Each decoding device 5 comprises a receiving part 2, for example a television tuner, a modem, etc. The data received by the receiving part 2 are stored in a buffer memory 3 and decoded in a decoding module 4. The decoding module decodes the data x (for example by permuting and/or logically combining image lines and/or digital blocs) and constructs in this manner a decoded image y that is reproduced by the reproducing means 8. The permutation and combination rules are defined through a secret decoding key K that is generated by a key generator 6. In the simplest case, the decoding key is defined in the decoding module and can thus not be modified.

FIG. 2 shows an example of a digital decoding module, here a descrambler 4. The decoding module comprises in this example a shift register 40 with a plurality of cells, in which for example following bits, bytes, groups of bytes (corresponding for example to a television signal line or an image block) of the encoded signals x(i) are stored. Each cell of the shift register 40 is connected with an AND-circuit 41, whose second entry is connected with an element (for example a bit) of a decoding key $K=\{k_n k_{n-1} k_{n-2} \ldots k_1 k_0\}$.

The exit of each AND-circuit 41 is directed to a XOR circuit 42, whose second entry is connected with the exit of the previous XOR circuit. The first cell of the shift register and the first XOR circuit 42 are connected with the encoded signal x(i). The last XOR circuit gives the decoded signal y(i).

This decoding module can decode with the decoding key $K=\{k_n k_{n-1} k_{n-2} \ldots k_1 k_0\}$ a signal x encoded with the polynomial $k_n x^n + k_{n-1} x^{n-1} + k_{n-2} x^{n-2} + \ldots + k_1 x + k_0$ and gener decoded signal y.

No standardized architecture has been defined for decoding devices and for decoding modules. In particular, the length of the decoding key K respectively of the shift register 40 and the format of the digital blocs in the cells of the shift register are dependent on the sending system and even on the sender. In many sending systems, more complex decoding modules with another architecture are used, for example decoding modules that replace several shift register or other logical circuits and more complex decoding algorithms are used. Each sender 1 thus selects a decoding system with which its security requirements can be fulfilled.

This has however the disadvantage for the user of the receiver 5 that it must usually acquire several decoding devices 5 when he wishes to receive data from several senders (for example television data) that use different encoding algorithms (for example different arrangements of shift register and logical circuits).

Furthermore, a sender can not replace the used encoding algorithm without replacing the entire collection of receiving devices distributed to the end users. When the used encoding algorithm no longer fulfills the desired security requirements, it can only be replaced with much effort.

The decoding key K used by the decoding module 4 can for example be defined by the sender 1 and stored in the decoding device. This has however the disadvantage that any one who has found the decoding key K can use it for an unlimited period of time to decode received data.

It is already known that this problem can be avoided if the key is periodically replaced. In this case, the sender must define a new key K and transmit it over a suitable secure channel to the decoding device 5.

WO9408408 describes for example a communication equipment with a central station which, if certain conditions are fulfilled, sends descrambling keys through a radio network to mobile decoders. This document however offers no solution to the problem of the invention.

EP626793 describes a decoder for television images with two processors. A first processor descrambles the data with a key that is sent encrypted by the sender and decrypted by a second processor in a chip card. This solution has however the disadvantage that for the descrambling of animated image data with a high resolution very fast processors (for example DSP) are required. Such processors are expensive and use much current, so that they are not suitable for being integrated in portable terminals (for example in chip cards).

WO90/10354 describes a decoder in which a table of decoding keys is generated by a random generator. The random generator is initialized with a secret initialization value KINI defined by the sender, in order to generate the-correct table.

EP723373 describes a decoder provided with a pseudo-noise (PN) generator, the encoded signals being decoded on the basis of the PN signal. In a variant embodiment, the PN signal depends on a descrambling key and a conversion logic that can be parameterized as wished. The decoding algorithm however remains always the same.

The security ensured by such known systems in which the structure of the decoding module 4 is known and in which only the descrambling key is secret, is only as good as the security that is ensured by the decoding key. Any one who knows a possibility of discovering the decoding key (for example through eavesdropping/listening in on the key during its transmission or through testing of all the possible keys) can also decode the received data.

It is an aim of the present invention to propose a new decoding device and a new decoding method that allow a more secure encoding.

It is another aim of the invention to propose a new decoding device and a new decoding method that can be adapted to different encoding algorithms.

It is another aim of the invention to propose a new high-performance decoding device and decoding method with which fast data streams/flows can also be decoded.

BRIEF SUMMARY OF THE INVENTION

According to the present invention, these aims are achieved in particular through the characteristics of the independent claims. Further advantageous embodiments are moreover described in the dependent claims and in the description.

In particular, these aims of the invention are achieved with a decoding device and with a decoding method in which a programmable FPGA circuit is used and in which the decoding of the image data is dependent on the programming of this FPGA circuit.

FPGA (Field Programmable Gate Arrays) circuits consist of several logical blocs within a single integrated circuit, whose arrangement and connections are determined through the content of a memory. The functionality of a FPGA circuit can be modified very fast by writing new data in the FPGA memory.

Different circuits with FPGA are described among others in the documents classified in group H03K-19/177 of the international patent classification. Therefore, these circuits will not be described in any further detail.

The decoding device according to the invention has the advantage that it can be adapted in a new decoding algorithm by writing in the FPGA memory. These new data can for example be transmitted by the sender over different possible channels. This has the advantage that a sender can replace the decoding algorithm very easily for all decoding devices by sending new data for programming the FPGA circuit. The decoding algorithm can even be modified several times within a broadcast or during the transmission of a single page.

There is an advantage in the possibility of transmitting data for programming the FPGA circuit through another transmission channel and/or at another time as the decoding key. Data for programming the FPGA circuit can thus be distributed for example as a kind of authorization token in chip cards, in applets etc. that must be acquired by the end users and that can be used only when the appropriate decoding key is known.

DESCRIPTION OF THE DRAWINGS

Hereafter, preferred embodiments of the invention will be described in more detail with the aid of the attached figures, in which:

FIG. 3 shows diagrammatically a system with a decoding device in a first embodiment of the invention.

FIG. 4 shows diagrammatically a system with a decoding device in a second embodiment of the invention.

Figure 1:
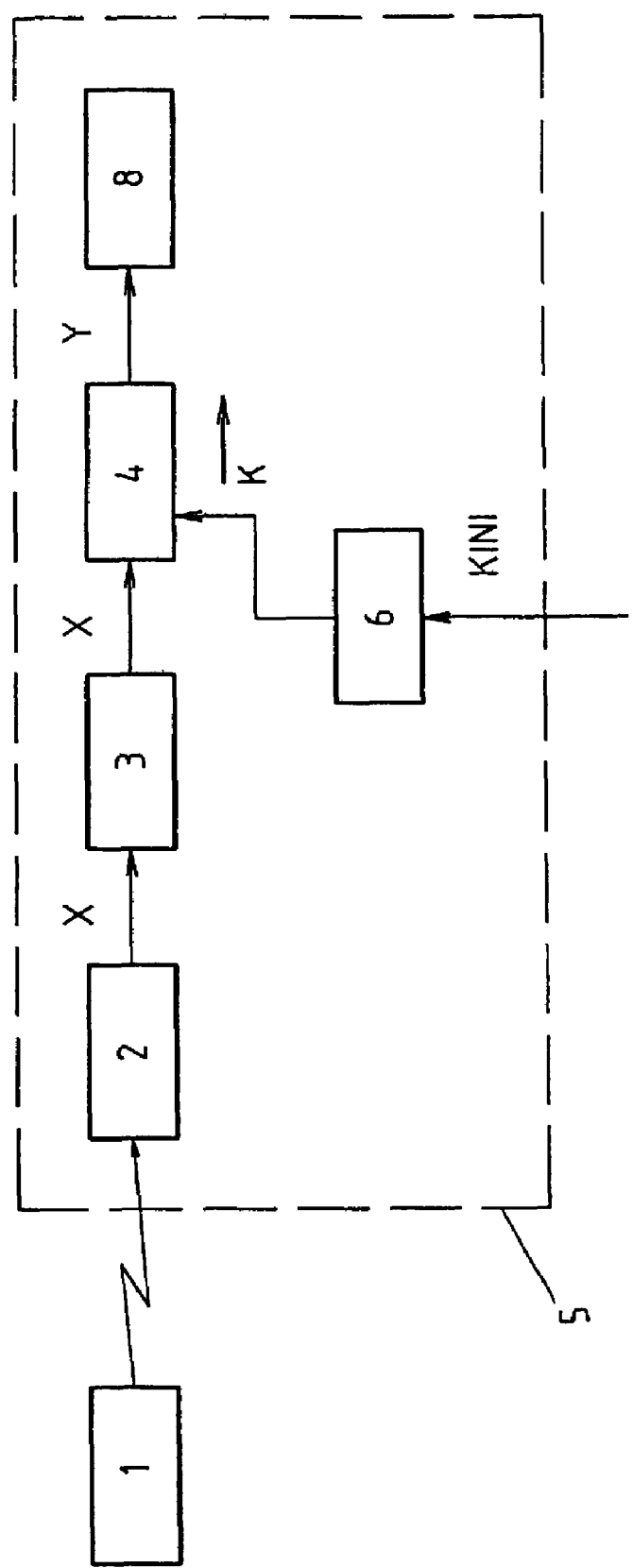
FIG. 1 already described above shows diagrammatically a system with a known decoding device 5.

LISTING OF DRAWING ELEMENTS:

Element 1 is a Sender; element 2 is a Receiving part (in the decoding device); element 3 is a Buffer memory; element 4 is a Decoding module; element 13 is a Time module; element 6 is a Key generator (radom generator or decypter); element K is a Decoding key; element KINI is an Initialization value of the radom generator: element 7 is an FPGA-memory; element 8 is a Reproducing means; element 9 is a Mobile Radio Part; element 10 is a Mobile Radio Network; and element 11 is a Billing Center.

FIG. 3 illustrates the architecture of a system with a decoding device according to a first embodiment of the invention. In this example, the system comprises a sender 1, preferably a sender that sends data in broadcast mode. The sender 1 comprises an encoding device, not represented, in order to decode at least a part of the broadcast data, so that only authorized viewers (who have the appropriate decoding key) can reproduce these data in a recognizable form.

The sender 1 can for example consist of a DAB (Digital Audio Broadcasting) resp. DVB (Digital Video Broadcasint) sender. Other sending methods and protocols, for example with ADSL, UMTS (Universal Mobile Telephone System), PLC (Power Line Communication), FFTH (Fiber to the Home) or other optical methods can also be used in the framework of this invention.

The data broadcast by the sender 1 over the transmission channel A are received by one or several receivers 5. In this embodiment, the receiver 5 contains a receiving part 2, for example a DAB, DVB, ADSL, UMTS or PLC receiver, that receives and transforms in a suitable digital format the received data (for example image sequences, internet pages, WAP cards, DAB-accompanying data, etc.). Transformed digital data x are then stored in a buffer 3.

Figure 2:
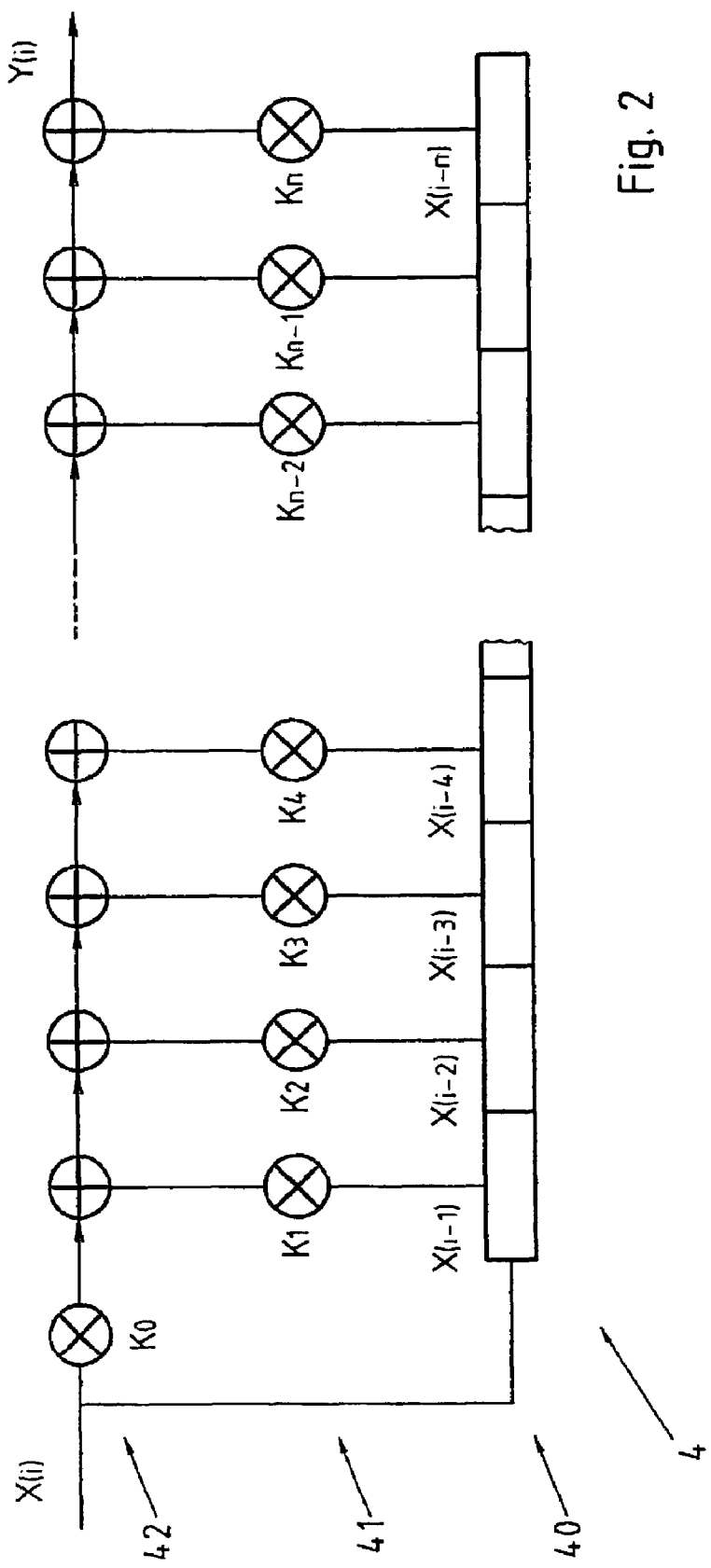
FIG. 2 already described above shows diagrammatically a decoding module.

The decoding device 5 according to the invention comprises a decoding module 4 (for example a descrambler according to FIG. 2) that uses a decoding key K in order to transform encoded data x into decoded data y that can be reproduced by the reproducing means 8.

In this first embodiment, the decoding key K is generated by a key generator 6 comprising a FPGA circuit. The architecture of the key generator 6, i.e. the interconnection of the logical components in the FPGA circuit 6, is defined through a writable FPGA memory 7, for example a RAM or a ROM or EEPROM in a replaceable module (for example in a removable chip card).

In this embodiment, the key generator 6 determines the decoding key K on the basis of a value KINI transmitted by the sender 1, as will be explained later. The key generator can in a first possible variant embodiment consist of a random generator that generates a series of keys, the series being dependent upon the initialization value KINI and the structure of the random generator 6. The sender 1 (or the user of the decoding device 5) can thus generate different series of decoding keys by presenting at the entry of the key generator 6 a new value KINI and/or by re-programming the content P of the FPGA memory 7. In another variant embodiment, the key generator consists of a decoder that can decrypt the encrypted key data sent by the sender in order to reconstruct the decoding key. The decoder can for example use an asymmetrical decoding algorithm (for example according to RSA, ECC, El-Gamal, DSA, ESIGN, etc.).

An-unauthorized user who knows only the initialization value KINI but not the content P of the FPGA memory 7 can thus not reconstruct the generated series of decoding keys. Conversely, knowing the content P of the FPGA memory is not sufficient for decoding received data x if the initialization value KINI is not known.

The receiver 5 preferably comprises a second receiving part 9 for a second communication network 10 (for example a GSM or UMTS mobile radio part, a PLC terminal, an internet-client, etc.). Data from the server 1, among others the initialization value KINI and/or the content of the memory 7, can preferably be transmitted over a transmission channel B through this second communication network to the receiver 5 (for example as applet, as MEXE program, as WAP application, etc.). These data can for example be downloaded in the network 10 from a server, for example from a WAP server (Wireless Application Protocol) or a http-server, for example against payment through known electronic money transaction methods (for example with the Flexmart-method described in patent application WO9828900).

The initialization value KINI and/or the content of the FPGA memory 7 can as a variant also be transmitted over the same channel A as the encoded data, for example as encrypted program-accompanying or not program accompanying data (PAD resp. NPAD) of a DAB resp. DVB sender.

As a further variant embodiment, the initialization value and/or the content P of the FPGA memory 7 can also be copied by the sender 1 in chip cards 12 that are for example distributed to all authorized subscribers or that can be purchased in kiosks, shops etc. It is for example possible to purchase chip cards that enable the owner to reproduce data of a certain sender, of a certain program, or a certain daily program or for a certain duration.

It is an advantage to have the possibility of transmitting the initialization value KINI and the content of the memory P over two different channels, in order to prevent that someone listening in and discovering only KINI or only P can illicitly decode data. These two data KINI and P can furthermore be updated at different times (for example, the value KINI can be replaced several times during each transmission through the channel A or B and the content of the FPGA memory through purchase of a new chip card 12).

This also allows the possibility of using the initialization value KINI or the content of the memory P as authorization tokens in order to authorize access to certain senders, to certain broadcast programs or to certain data. Such authorization tokens can for example be distributed through different channels; a decoding is however only possible if the user also knows the other appropriate value (KINI respectively P), that is for example replaced automatically for each subscriber.

The key generator 6 and/or the FPGA memory 7 can be located in a removable chip card 12, for example in a chip card in ISO format. The one skilled in the art will understand that other components of the receiver 5 can also be integrated in the chip card 12, among others also the decoding module 4. The chip card communicates with the sender 5 through a preferably standardized API interface. The chip card is preferably a JavaCard (trademark of Sun Corporation) that can perform Java Applets (trademark of Sun Corporation).

This opens up the possibility of adapting the key generator 6 easily to another sender or to a certain broadcast program by simply replacing the chip card.

It is also possible to store several sets of FPGA memory content in the decoding device 5, the suitable set being automatically selected when the user chooses another sending channel or a certain broadcast program. FPGA memory content can in this case be used as Plug-In-Module, each Plug-In-Module allowing access to certain data.

The chip card 12 further preferably comprises a storage area 120 with an identification of the user, for example an IMSI (International Mobile Subscriber Identity) that can also be sued by the second receiving part 9 to identify the user of the receiver 5 in the mobile radio network 10. This identification can also be used by a billing center 11 that can be reached through the second communication network 10 in order to bill the user for the reproduction of the data or the downloading of the authorization token. The billed amount can for example be billed monthly with the telephone bill if the billing center is administrated by the operator of the network 10 or can be debited to a prepaid account in the chip card 12 through known mechanisms.

The billed amount can preferably be dependent on the duration of the data reproduction and/or on the reproduced data. Amounts dependent on the data can for example be indicated as program-accompanying data in a DAB or DVB program. The duration of reproduction can for example be determined by a time module 13 in the receiver 5. In a preferred embodiment, the time module is integrated in the chip card 12, as described in patent application WO99/25111.

Hereafter, another embodiment of the invention will be described in relation to FIG. 4. The same or similar characteristics are indicated with the same reference signs in all figures and will be described anew only if necessary.

In this second embodiment, the decoding device 5 according to the invention comprises a decoding module 4 comprising a FPGA circuit or consisting of a FPGA circuit. The architecture of the decoding module 4, i.e. the interconnection of the logical components in the FPGA circuit 4, is defined through a re-writable FPGA memory 7, for example a RAM, ROM or EEPROM in a replaceable module, for example in a removable chip card.

The decoding module 4 uses a decoding key K determined by the key generator 6 in order to convert coded data x into decoded data y that can be reproduced by the reproducing means 8. The key generator 6 determines the decoding key K on the basis of a value KINI transmitted by the sender 1, as will be described further below. As in the first embodiment, the key generator can consist for example of a random generator or of a decoder that can decrypt encrypted key data sent by the sender in order to reconstruct the decoding key. In the simplest case, the decoding key K or the initialization value KINI is determined in the decoding module and does not have to be transmitted separately. In another embodiment, the decoding key consists of a simple memory area in which the key is copied.

This embodiment allows the entire decoding module 4 to be reprogrammed by entering new data in the FPGA memory 7. Thus, the decoding device 5 can be adapted very fast and without much effort to different senders or broadcast programs.

Furthermore, this embodiment allows very complex re-programmable decoding modules 4 to be manufactured, that can be completely re-programmed and that can process for example several bits in parallel, for example words of 512 bits or more. In this manner, the data made available through the receiving part 2 can be processed in real time, without having to be stored previously in the buffer storage 3. It is thus possible to forgo completely the buffer storage 3 or to considerably reduce its size.

Additionally, very complex structural modifications of the decoding module 4 can be performed, enabling structurally completely different decoding modules 4 to be programmed. With the same FPGA circuit, it is possible to program decoding modules that move entire lines or other decoding modules that decode or shift individual bits or bytes.

The decoding module 4, the key generator 6 and/or the FPGA memory 7 can be located in a replaceable chip-card, for example in a chip-card in ISO format. The one skilled in the art will understand that other components of the receiver 5 can also be integrated in the chip-card 12. The chip-card communicates with the receiver 5 through a preferably standardized API interface. The chip-card is preferably a JavaCard (trademark of Sun Corporation) capable of executing Java applets (trademark of Sun Corporation).

As in the first embodiment, the content of the FPGA and the initialization value KINI can be modified by the sender 1 independently from one another and through different transmission channels. It is also possible to automatically update one value (for example the initialization value KINI) periodically whilst the other value, for example the FPGA content, must be purchased as authorization token in chip-cards or in applets, in order to be able to access certain data or certain senders.

In both embodiments, it is furthermore possible to use time-dependent authorization tokens P and/or KINI which are valid for example only during a certain period of time or only at certain times of the day or days of the week. This invention furthermore allows different qualities of authorizations to be allocated. For example, it is possible to sell "good" FPGA contents enabling an optimal decoding and a good reproduction of data and, at a lower price, "less good" FPGA contents that do not program the decoding module optimally so that the quality is sufficient for example only for smaller advertisements or only for archiving or indexing the data.

It is also possible to distribute authorization tokens that allow only the decoding of certain image parts, for example only the decoding of certain windows in a system with a graphical user interface (GUI) or only the decoding of data transmitted during the line trace interval of a television program.

The invention claimed is:

1. A decoding device comprising:
a decoding module for decoding digitally encoded image data transmitted over a broadcast channel to said decoding device, the decoding of said image data being dependent on a FPGA circuit,
said FPGA circuit having a FPGA memory and a plurality of logic blocs whose interconnection can be modified by modifying the FPGA memory,
said decoding module further using a decoding key that is determined by said FPGA circuit,
wherein said decoding key is based on an initialization value that is transmitted over a mobile radio network channel to said decoding device, or said decoding key is based on said FPGA memory which is updated over the mobile radio network channel.

2. The decoding device of claim 1, said decoding key being determined with a random generator executed with the FPGA circuit.

3. The decoding device of claim 2, said random generator using an initialization value stored in a chip-card.

4. The decoding device of claim 2, said random generator using an initialization value that is transmitted over the mobile radio network channel to said decoding device.

5. The decoding device of claim 2, said random generator using the initialization value that is transmitted in encrypted form over a broadcast channel and that is decoded in a chip-card in said decoding device.

6. The decoding device of claim 5, said chip-card comprising said FPGA circuit for decoding said initialization value.

7. The decoding device of claim 1, said decoding key being stored in a chip-card.

8. The decoding device of claim 1, the initialization value of said decoding key being transmitted in encrypted form over a broadcast channel and being decoded in a chip-card in said decoding device.

9. The decoding device of claim 8, said chip-card comprising the FPGA circuit for decoding said decoding key.

10. The decoding device of claim 1, said FPGA memory being located in a chip-card.

11. The decoding device of claim 1, said first FPGA circuit being located in a chip-card.

12. The decoding device of claim 1, the content of said FPGA memory being transmitted in encrypted form over a broadcast channel and being decoded in a chip-card in said decoding device.

13. The decoding device of claim 1, further comprising a DAB or DVB receiver to receive animated image data.

14. The decoding device of claim 1, further comprising a PLC receiver to receive animated image data.

15. The decoding device of claim 1, further comprising an ADSL receiver to receive animated image data.

16. The decoding device of claim 1, further comprising a UMTS receiver to receive animated image data.

17. The decoding device of claim 1, further comprising an identification module in which the user's identity is stored, as well as a mobile radio part with which said identity can be sent forth.

18. A method for decoding encoded animated image data transmitted over a broadcast channel, including the following steps:
programming a FPGA circuit having a memory,
decoding said image data on the basis of said FPGA circuit, the decoding algorithm being modified by modifying the FPGA memory and on the basis of a decoding key determined with the programmed FPGA circuit,
wherein said decoding key is based on an initialization value that is transmitted over a mobile radio network channel to said FPGA circuit, or said decoding key is based on said FPGA memory which is updated over the mobile radio network channel.

19. The method of claim 18, said decoding key being determined with a random generator produced through a programmable FPGA circuit.

20. The method of claim 19, said random generator using the initialization value which is distributed per chip-card.

21. The method of claim 19, said random generator using the initialization value which is transmitted over the mobile radio network channel to a decoding device.

22. The method of claim 19, said random generator using the initialization value which is transmitted in encrypted form over the mobile radio network channel and decrypted in a chip-card in a decoding device.

23. The method of claim 18, said decoding key being transmitted in encrypted form over the mobile radio network channel and decrypted in a chip-card.

24. The method of claim 18, said image data being transmitted over a DAB or DVB transmission channel.

25. The method of claim 18, said image data being transmitted over a PLC transmission channel.

26. The method of claim 18, said image data being transmitted over an ADSL transmission channel.

27. The method of claim 18, said image data being transmitted over a UMTS transmission channel.

28. The method of claim 18, a user's identity being determined on the basis of an identification module and sent over a mobile radio channel to a billing center.

29. The method of claim 18, an encoding algorithm used by a certain broadcast sender being modified several times and said FPGA circuit being correspondingly re-programmed several times.

30. The method of claim 29, said broadcast sender modifying the recognizability of different programs by adapting said encoding algorithm.

31. A decoding device comprising:
a network interface,
a decoding module for decoding digitally encoded image data transmitted over a broadcast channel to said decoding device, the decoding of said image data being dependent on a FPGA circuit,
said FPGA circuit having a FPGA memory and a plurality of logic blocs whose interconnection can be modified by modifying the FPGA memory,
said decoding module further using a decoding key that is determined by said FPGA circuit,
wherein said decoding key is based on an initialization value that is transmitted over said network interface to said decoding device, or said decoding key is based on said FPGA memory which is updated over said network interface.

32. A decoding module for decoding digitally encoded image data transmitted over a broadcast channel to said decoding module, the decoding of said image data being dependent on a FPGA circuit and on a decoding key, said decoding module comprising a FPGA circuit having a memory and a plurality of logic blocs whose interconnection can be modified by modifying the FPGA memory, wherein either said decoding key or the content of said FPGA memory is transmitted over a mobile radio network channel or on a chipcard to said decoding device which is updated a plurality of times.

33. A method for decoding digitally encoded image data transmitted over a broadcast channel to a decoding device, the decoding of said image data being dependent on a FPGA circuit and on a decoding key, the method comprising providing a FPGA circuit having a plurality of logic blocs whose interconnection can be modified by modifying the FPGA memory, transmitting either said decoding key or the content of said FPGA memory over a mobile radio network channel or providing either said decoding key or the content of said FPGA memory on a chipcard to said decoding device and updating the chipcard a plurality of times.

* * * * *